(12) United States Patent
Kolda

(10) Patent No.: US 7,213,731 B1
(45) Date of Patent: May 8, 2007

(54) HOLD-DOWN FOR A VEHICLE-MOUNTED EQUIPMENT CARRIER

(75) Inventor: Clint D. Kolda, Cottage Grove, WI (US)

(73) Assignee: Saris Cycling Group, Inc., Madison, WI (US)

( * ) Notice: Subject to any disclaimer, the term of this patent is extended or adjusted under 35 U.S.C. 154(b) by 312 days.

(21) Appl. No.: 10/682,717

(22) Filed: Oct. 9, 2003

(51) Int. Cl.
B60R 9/06 (2006.01)

(52) U.S. Cl. .................. 224/537; 224/532; 224/536; 224/42.39

(58) Field of Classification Search .............. 224/532, 224/534, 536, 537, 42.39, 488, 495
See application file for complete search history.

(56) References Cited

U.S. PATENT DOCUMENTS

| | | | |
|---|---|---|---|
| 4,830,250 A | 5/1989 | Newbold et al. | |
| 5,052,605 A * | 10/1991 | Johansson | 224/324 |
| 5,056,699 A | 10/1991 | Newbold et al. | |
| 5,056,700 A | 10/1991 | Blackburn et al. | |
| 5,118,020 A | 6/1992 | Piretti | |
| 5,195,670 A | 3/1993 | Piretti et al. | |
| 5,211,323 A | 5/1993 | Chimenti et al. | |
| 5,259,542 A | 11/1993 | Newbold et al. | |
| 5,363,996 A | 11/1994 | Raaber et al. | |
| 5,373,978 A | 12/1994 | Buttchen et al. | |
| 5,495,970 A | 3/1996 | Pedrini | |
| 5,505,357 A | 4/1996 | Chimenti et al. | |
| 5,573,165 A | 11/1996 | Bloemer et al. | |
| 5,593,076 A | 1/1997 | Biondo | |
| 5,598,960 A | 2/1997 | Allen et al. | |
| D378,289 S | 3/1997 | Lundgren | |
| 5,645,202 A | 7/1997 | Kaloustian | |
| 5,775,555 A | 7/1998 | Bloemer et al. | |
| 5,938,093 A | 8/1999 | Bloemer et al. | |
| 6,286,738 B1 | 9/2001 | Robins et al. | |
| 6,386,407 B1 * | 5/2002 | Erickson et al. | 224/282 |
| 6,425,509 B1 * | 7/2002 | Dean et al. | 224/324 |
| 6,616,023 B1 * | 9/2003 | Dahl et al. | 224/537 |
| 6,644,525 B1 * | 11/2003 | Allen et al. | 224/497 |
| 6,648,195 B2 * | 11/2003 | Morris et al. | 224/505 |
| 6,772,927 B2 * | 8/2004 | Bogoslofski | 224/324 |

* cited by examiner

Primary Examiner—Nathan J. Newhouse
Assistant Examiner—Justin M. Larson
(74) Attorney, Agent, or Firm—Boyle Fredrickson Newholm Stein & Gratz S.C.

(57) ABSTRACT

A cradle or hold-down for a vehicle-mounted equipment carrier, such as a bicycle carrier, includes a resilient support member interconnected with a rigid shell, in combination with a flexible retainer strap that is secured to a retainer base associated with the rigid shell. The support member defines a passage within which a support arm of the carrier is received, and the shell includes aligned openings through which the support arm extends. The support member includes engagement structure, such as a trough, which is configured to receive and engage the equipment supported by the carrier, e.g. the frame of a bicycle. The retainer base is formed integrally with the shell, and extends laterally from the shell so as to be offset from the engagement area of the support member. The retainer strap is fixed to the retainer base, such as by an interlocking T-slot arrangement interposed between the retainer base and the retainer strap.

29 Claims, 5 Drawing Sheets

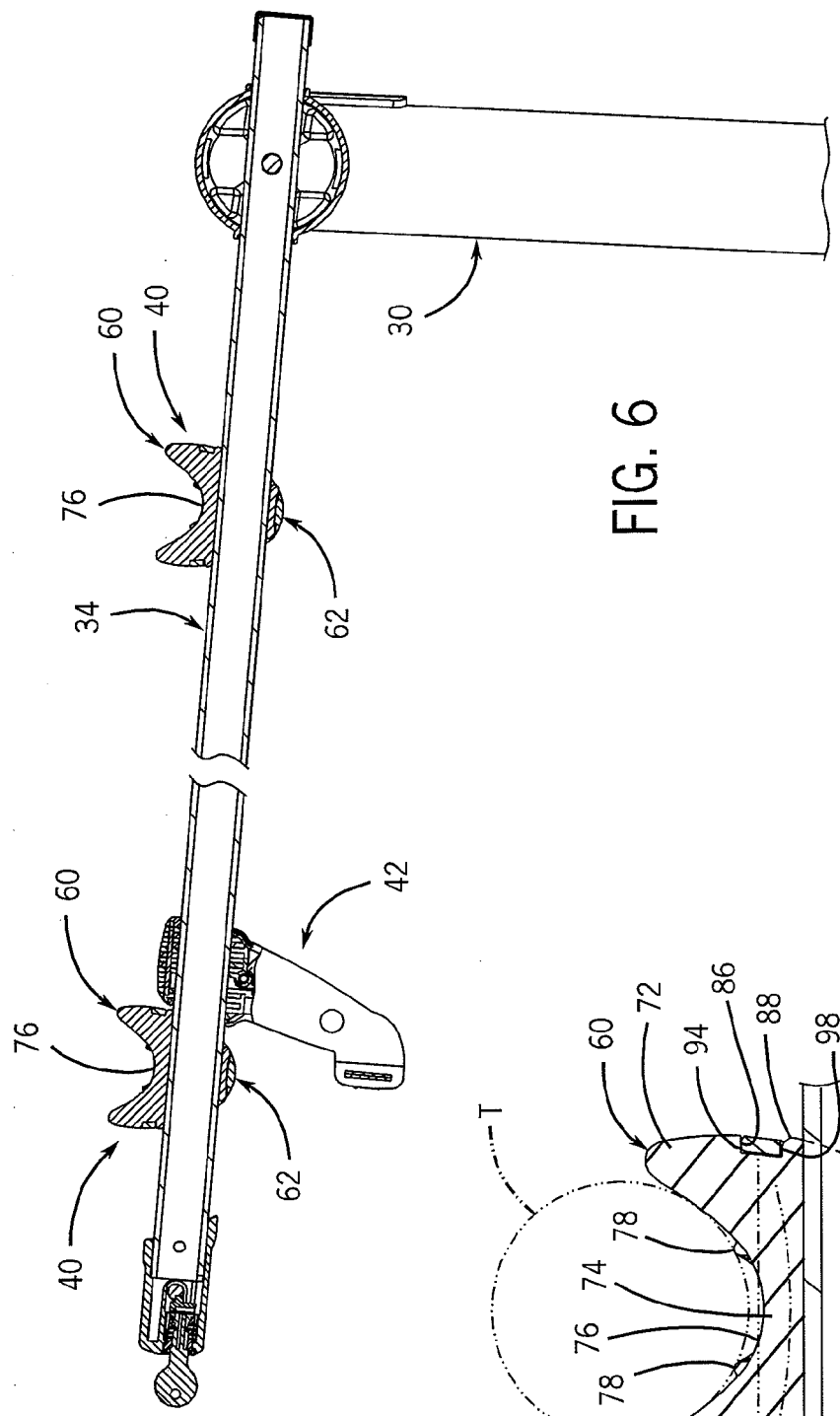

HOLD-DOWN FOR A VEHICLE-MOUNTED EQUIPMENT CARRIER

BACKGROUND AND SUMMARY OF THE INVENTION

This invention relates to a vehicle-mounted equipment carrier, such as a bicycle carrier, and more particularly to a cradle or hold-down for engaging an item of equipment, such as a bicycle, with a support member of the carrier.

In accordance with one aspect of the invention, a cradle or hold-down for a vehicle-mounted equipment carrier, such as a bicycle carrier, includes a support section that is engaged with a support arm of the carrier, in combination with a retainer section that is interconnected with the support section and is laterally offset from the support section. The retainer section includes a flexible retainer member, such as a retainer strap, which extends from a base of the retainer section. The support section defines an outwardly facing engagement surface that is configured to engage the item of equipment, such as the frame of a bicycle. In one form, the support section includes a resilient support member having a passage through which the support arm of the carrier extends, and the resilient support member defines the outwardly facing engagement surface. The resilient support member is contained within an interior defined by a rigid shell member, which engages external surfaces defined by the resilient support member and provides support for the structure of the resilient support member. The resilient support member and the rigid shell member define interlocking structure for maintaining the support member and the shell member together. The base of the retainer section is preferably formed integrally with the rigid shell member, and comprises a lateral extension of the shell member. The flexible retainer member is secured to the base of the retainer section via mating engagement structure. Representatively, the mating engagement structure may be in the form of an upwardly facing T-shaped slot in the base of the retainer section, in combination with a matching inverted T-shaped projection on the flexible retainer member that is received within the T-shaped slot in the base of the retainer section.

In accordance with another aspect of the invention, a cradle or hold-down for a vehicle-mounted equipment carrier, such as a bicycle carrier, includes a resilient support member contained within a rigid outer shell. The resilient support member defines a passage through which the support arm of the carrier extends, and is maintained in position on the support arm via frictional engagement of the resilient support member with the support arm. The outer shell includes aligned openings through which interlocking structure of the support member extends, so as to interlock the support member and the rigid outer shell. In one form, the interlocking structure of the support member comprises a pair of oppositely facing peripheral rims or lips, each of extends from a side surface of the support member at the location at which the passage opens onto the side surface of the support member. The rims pr lips extend into the aligned openings in the outer shell, to interlock the support member and the outer shell. The shell defines an upwardly facing opening that supports an upwardly facing engagement section of the support member. With this construction, the support member is received within an internal cavity defined by the rigid outer shell. The cradle or hold-down further includes a retainer member for maintaining the item of equipment in engagement with the engagement surface of the support member. The retainer member is preferably in the form of a retainer strap that is adapted to be wrapped about the item of equipment, and which is mounted to a retainer base section that is laterally offset from the engagement section of the support member. In one form, the retainer base section is formed integrally with the rigid outer shell. The retainer strap and the retainer base section include a connection arrangement, which may be in the form of a slot in the retainer base section that is configured to receive a projection associated with the retainer strap. The projection is slidably engaged within the slot, so as to securely mount the retainer strap to the retainer base section. The resilient support member is configured to prevent disengagement of the projection of the retainer strap from the slot of the retainer base section when the support member is received within the internal cavity of the outer shell.

The features and aspects of the present invention as summarized above may be individually incorporated in a cradle or hold-down for an equipment carrier. In a preferred form, however, the features and aspects of the present invention are used in combination to provide a cradle or hold-down having a particularly advantageous construction and operation.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 6 is a section view taken along line 6–6 of FIG. 2;

FIG. 7 is a partial section view taken along line 7—7 of FIG. 5;

DETAILED DESCRIPTION OF THE INVENTION

Figure 1:
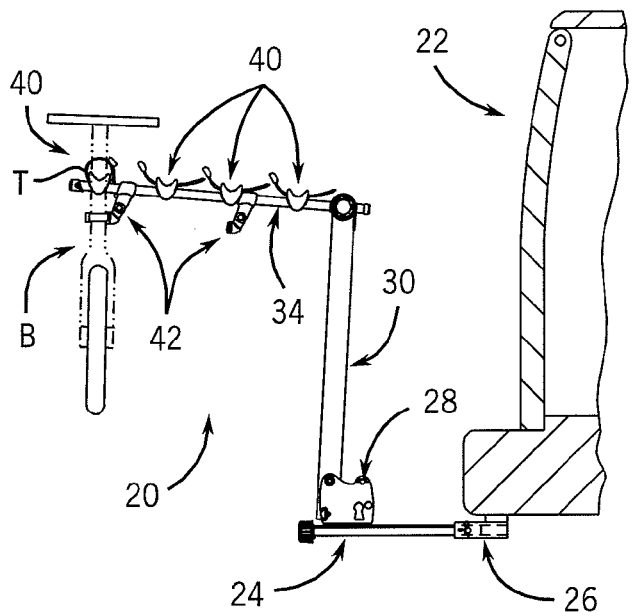
FIG. 1 is a side elevation view illustrating a vehicle-mounted equipment carrier, in the form of a bicycle carrier, which incorporates the cradle or hold-down of the present invention.

FIG. 1 illustrates an equipment carrier, in the form of a bicycle rack 20, secured to a vehicle 22 for supporting equipment, such as one or more bicycles B, on vehicle 22.

Bicycle rack 20 is secured to vehicle 22 by engagement of a mounting member 24, which forms a part of bicycle rack 20, within a passage defined by a hitch receiver 26 that is mounted to vehicle 22 in a conventional manner. The connection of mounting member 24 to hitch receiver 26 is detailed in application Ser. No. 10/679,739 filed Oct. 6, 2003, now U.S. Pat. No. 6,974,147, issued Dec. 13, 2005, the disclosure of which is hereby incorporated by reference.

Figure 2:
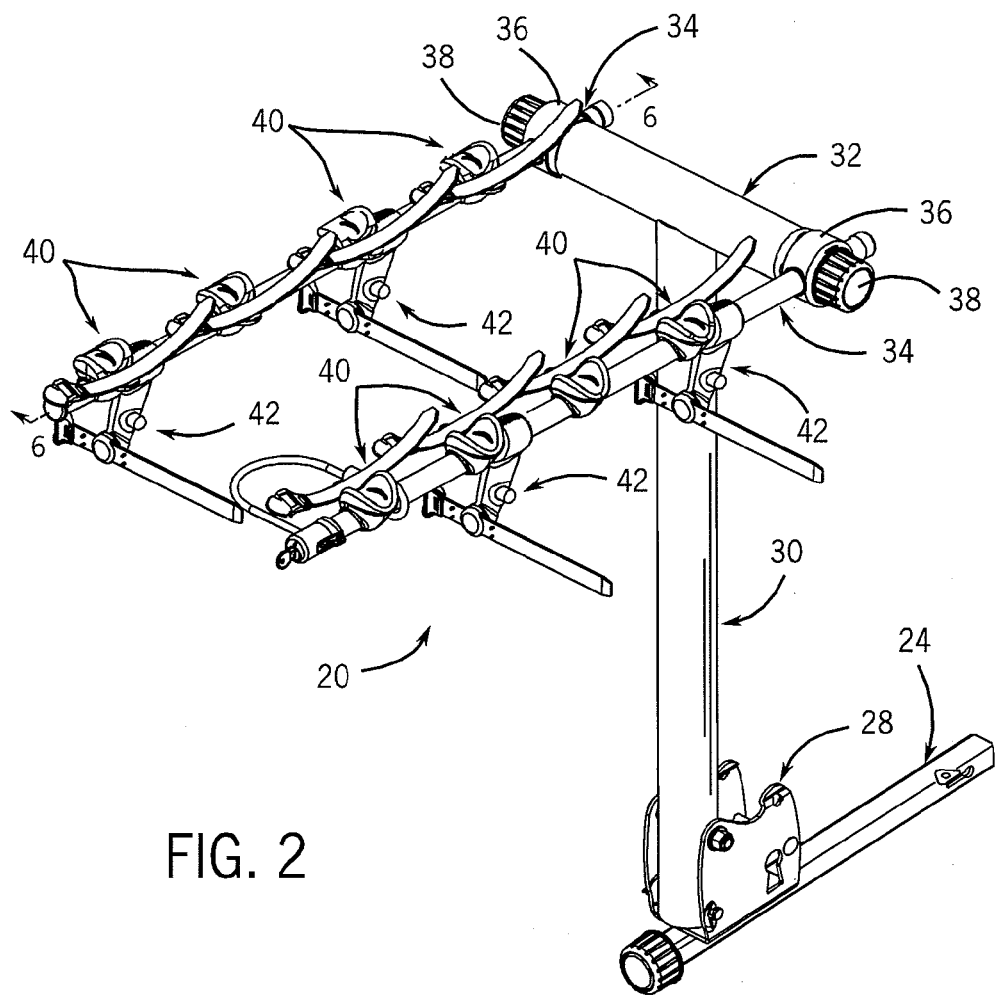
FIG. 2 is an isometric view of the equipment carrier of FIG. 1.
Figure 3:
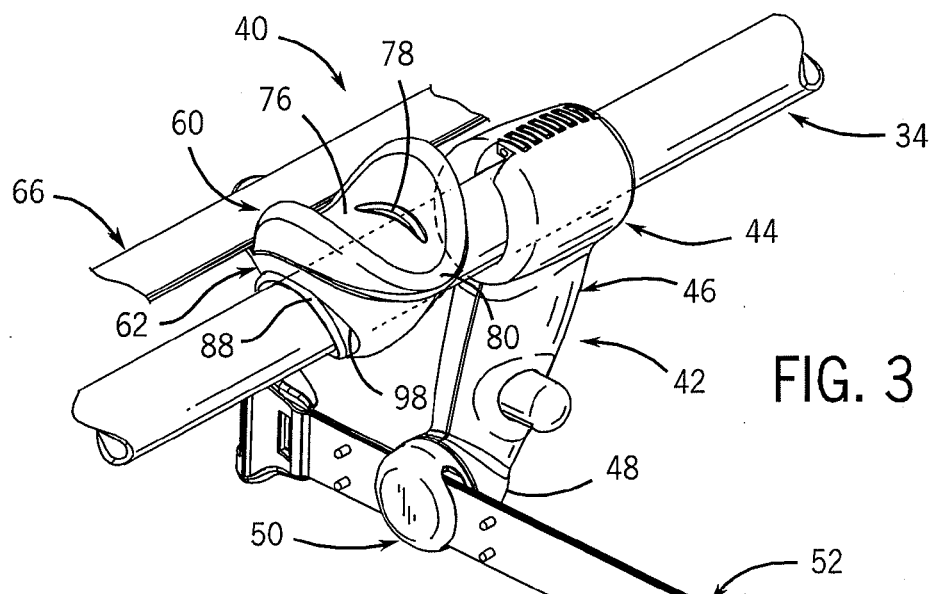
FIG. 3 is an enlarged partial isometric view showing a portion of the equipment carrier of FIGS. 1 and 2, illustrating the cradle or hold-down in accordance with the present invention secured to the support arm of the carrier, in combination with a stabilizing member incorporated in the carrier.

In the illustrated embodiment, bicycle rack 20 includes a mounting bracket 28 secured to mounting member 24, and an upwardly extending vertical support member 30 is connected at its lower end to mounting bracket 28. A transversely extending upper member 32 is secured to the upper end of vertical support member 30, and a pair of support arms 34 extend rearwardly from the ends of transverse upper member 32. Each support arm 34 is pivotably interconnected at its inner end with the outer end of transverse upper member 32 via a hub member 36 and a knob 38. In a manner as detailed in copending application Ser. No. 10/682,716 filed Oct. 9, 2003, the disclosure of which is hereby incorporated by reference, the ends of transverse upper member 32 cooperate with hubs 36 and knobs 38 for selectively maintaining support arms 34 in either a raised, rearwardly extending operative position as shown in FIG. 2, or a lowered, downwardly extending inoperative position in which support arms 34 are oriented generally parallel to vertical support member 30.

Each support arm 34 has a series of cradles or hold-downs 40, constructed in accordance with the present invention, engaged along its length. Hold-downs 40 are configured to receive and engage a component of bicycle B, such as the bicycle top tube T or any other satisfactory component, for maintaining bicycle B in engagement with support arm 34 at a desired location along the length of support arm 34. With this construction, the top tube T of bicycle B extends across the space between support arms 34 for engagement with a pair of aligned hold-downs 40, each of which is carried by one of support arms 34. Bicycle B is thus supported from support arms 34 in a suspension-type manner.

Figure 4:
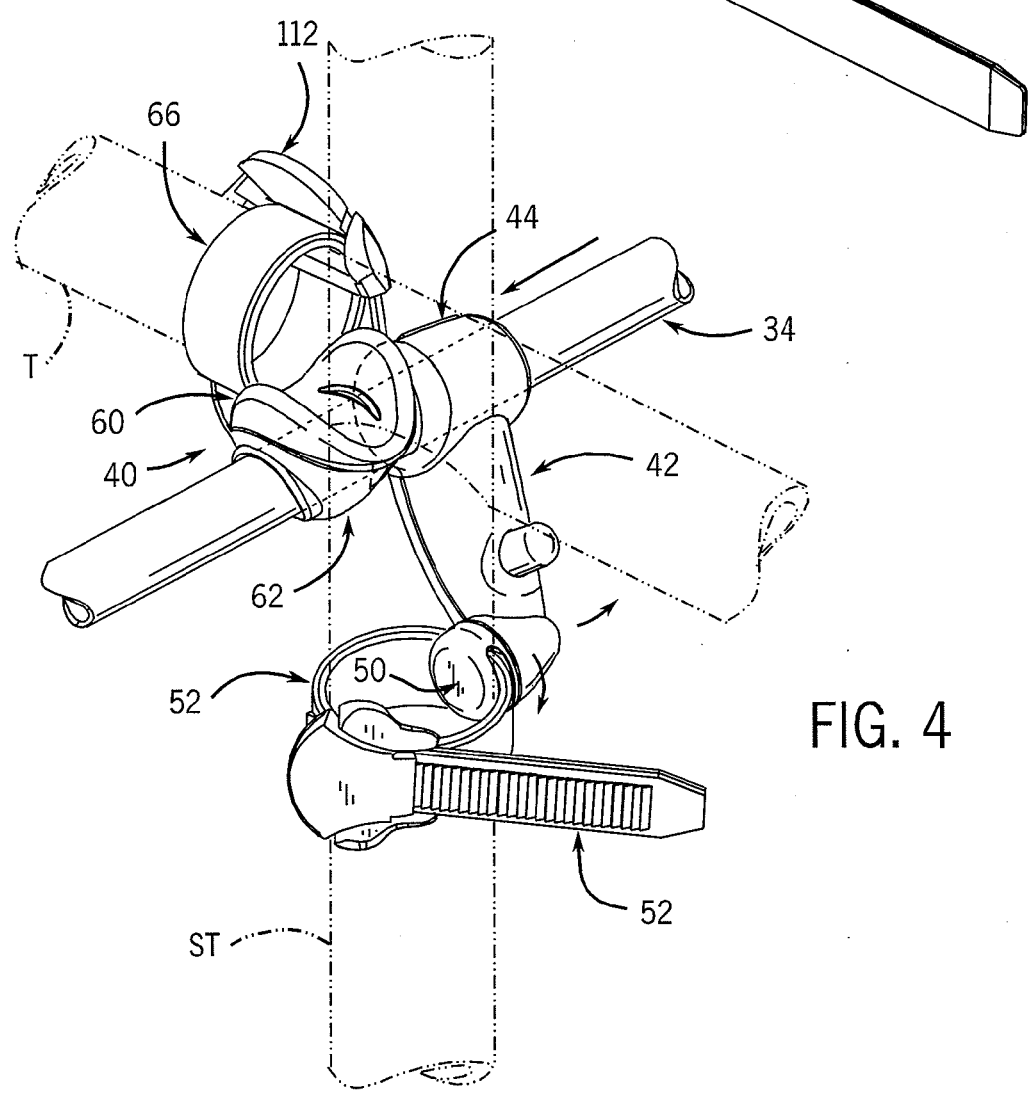
FIG. 4 is a view similar to FIG. 3, showing the manner in which an item of equipment is secured to the support arm of the carrier using the cradle or hold-down of the present invention, along with engagement of the stabilizing member with the item of equipment.
Figure 5:
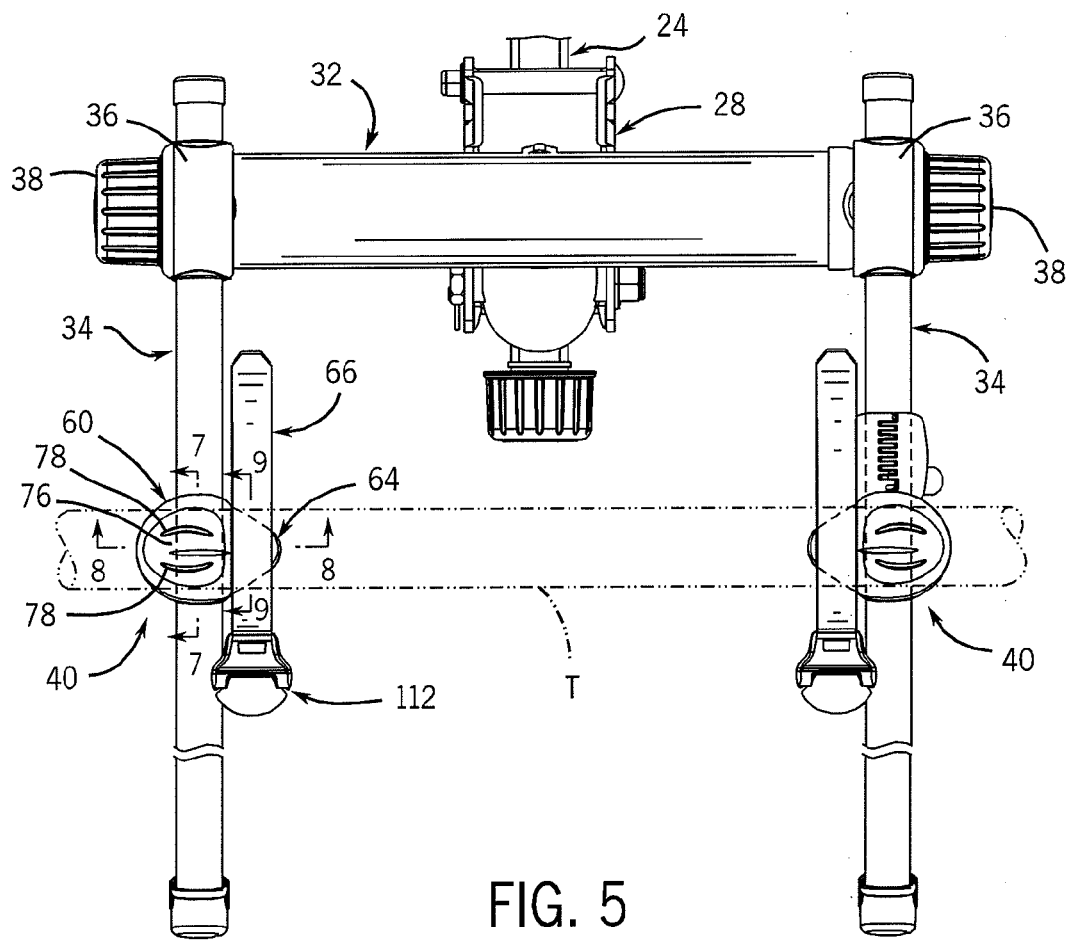
FIG. 5 is a top plan view of the equipment carrier of FIGS. 1 and 2.

In order to prevent swinging movement of bicycle B when bicycle B is supported on support arms 34, a series of stabilizing members 42 are secured to support arms 34. Representatively, a stabilizing member 42 is located adjacent one of the hold-downs 40 that engage top tube T of bicycle B. The construction and operation of stabilizing members 40 is set forth in application Ser. No. 10/682,471 filed Oct. 10, 2003, the disclosure of which is hereby incorporated by reference. Generally, each stabilizing member 42 includes a hub section 44 that is engaged with one of support arms 34 in a manner that provides axial and angular movement of stabilizing member 42 relative to support arm 34. Stabilizing member 42 further includes an arm section 46 that extends outwardly from hub section 44, and which terminates in an outer end section 48. A contact member 50 is rotatably mounted to outer end section 48, and carries a retainer strap 52. Stabilizing member 42 is selectively maintained in a desired axial and angular position relative to support arm 34 via an internal engagement mechanism, which is movable between an operative position and an inoperative position by operation of an actuator button 54 that extends outwardly from arm section 46. As shown in FIG. 4, stabilizing member 42 can be pivoted relative to support arm 34 so as to place contact member 50 adjacent a downwardly extending component of bicycle B, such as a seat tube ST, and retainer strap 52 can be placed in an optimal position for engagement about seat tube ST by rotation of contact member 50 relative to outer end section 48 of stabilizing member 42. In this manner, the frame of bicycle B is engaged at a location spaced vertically from the location at which bicycle B is suspended from support arms 34 by engagement with hold-downs 40, to stabilize bicycle B against swinging movement during operation of vehicle 22.

It should be understood that stabilizing members 42 are optional, and that bicycle rack 20 is capable of supporting bicycles such as B without the use of stabilizing members 42. It should also be understood that stabilizers having a construction other than stabilizing members 42 may be used to stabilize bicycles such as B that are carried on bicycle rack 20.

Referring to FIGS. 5–9, each hold-down 40 generally includes a resilient support member 60 which is received within an outer shell 62, in combination with a retainer arrangement that includes a retainer base section 64 and a flexible retainer strap 66 secured to retainer base section 64.

Figure 8:
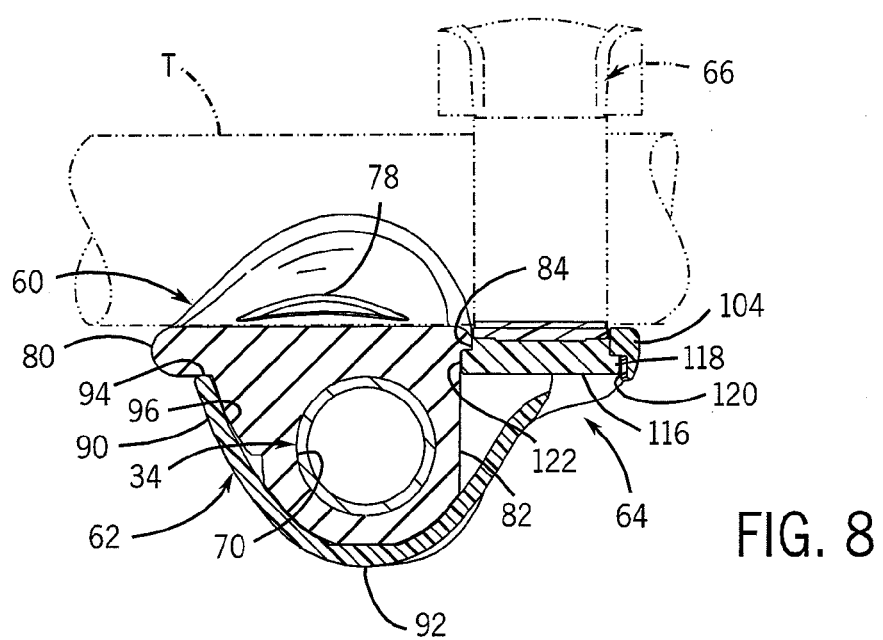
FIG. 8 is a partial section view taken along line 8—8 of FIG. 5.
Figure 9:
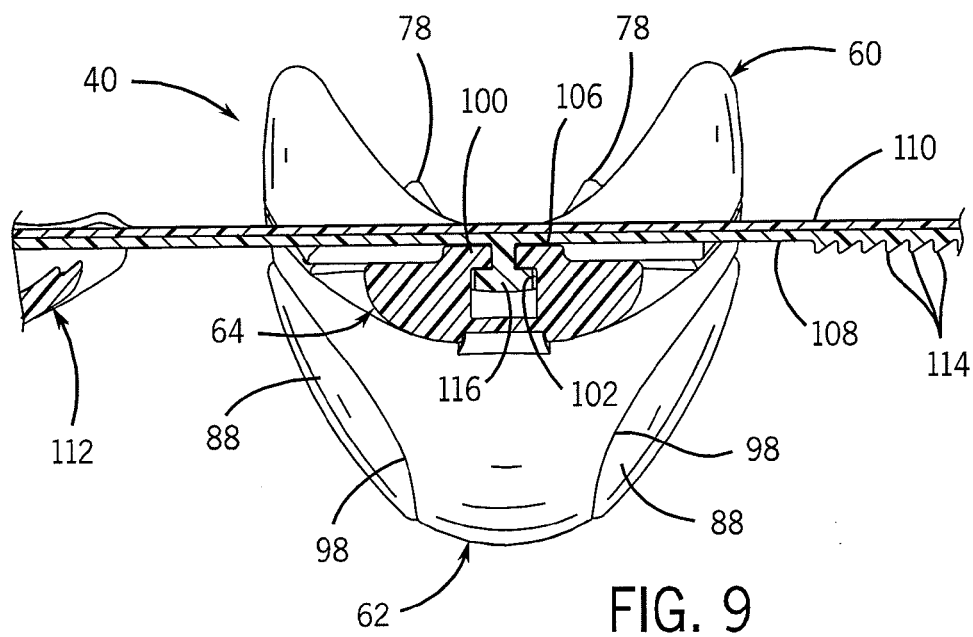
FIG. 9 is a partial section view taken along line 9—9 of FIG. 5.

As shown in FIGS. 7 and 8, the lower area of support member 60 includes an axial passage 70 through which support arm 34 extends. Passage 70 is sized so as to provide frictional engagement between support arm 34 and the inner surface of support member 60 that defines passage 70. The resilient material of support member 60 functions to maintain hold-down 40 in position on support arm 34, and also allows a user to manually apply an axial force to hold-down 40 so as to slide hold-down 40 along support arm 34 to allow hold-down 40 to be placed in a desired position along the length of support arm 34.

The area of support member 60 above support arm 34 is in the shape of a saddle, having outwardly extending side sections 72 with a base area 74 therebetween. Side sections 72 and base area 74 cooperate to define an outwardly facing channel or trough 76. The inner surfaces of side sections 74 include protrusions 78 that extend outwardly from the floor of trough 76. Side sections 72 and base area 74 have a configuration adapted to receive a component of bicycle B, such as top tube T, within trough 76.

As shown in FIG. 8, base area 74 of support member 60 is configured to define an axial extension 80 adjacent the area of support member 60 in which passage 70 is formed. Opposite extension 80, support member 60 includes an edge 82 that terminates in a lip 84.

In addition, an outer edge 86 (FIG. 7) extends about the periphery of support member 60. Edge 86 is located below side sections 72 and outwardly of base area 84 between side sections 72. Support member 60 includes a pair of outwardly extending rims or lips 88, each of which surrounds the opening of passage 70 onto the side surface of support member 60. An upper portion of each lip 88 is located between outer edge 86 of support member 60 and passage 70.

Support member 60 may be injection molded of a resilient material such as flexible PVC or Dynaflex, although it is understood that any other type of material and forming method may be employed.

Shell 62 of hold-down 40 is generally cup-shaped, and includes a side wall 90 and a bottom wall 92. Side wall 90 defines an upper edge 94 which extends approximately 270° about the circumference of side wall 90. Shell 62 defines an interior 96 within which support member 60 is received. As shown in FIG. 8, upper edge 94 of shell 62 underlies extension 80, which projects outwardly beyond upper edge 94. In addition, support member 60 and shell 62 are configured such that outer edge 86 of support member 60 engages upper edge 94 of shell 62. A pair of aligned openings 98 are formed in shell side wall 90, and lips 88 of support member 60 are received within and extend through openings 98. With this construction, engagement of lips 88 within openings 98 functions to interlock support member 60 and shell 62 together.

Retainer base section 64 extends from one side of shell 62, and is formed integrally therewith. Retainer base section 64 includes an upper wall 100, which is formed with an upwardly facing inverted T-shaped slot or channel 102 that opens into interior 96 of shell 62. T-slot 102 is closed at its outer end by an outer rim 104, and opens onto an outwardly facing surface 106 defined by upper wall 100.

Retainer strap 66 is formed of a flexible outer layer 108, and includes a resilient inner layer 110. A ratchet-type engagement clasp 112 is secured to one end of retainer strap 66. The opposite end of retainer strap 66 includes a series of ratchet-type teeth 114, which are configured for engagement by a movable engagement member of clasp 112, in a manner as is known.

As shown in FIG. 8, retainer base section 64 and retainer strap 66 are constructed such that the exposed surface of inner layer 110 is generally in alignment with and spaced slightly above the lowermost extent of trough 76 of support member 60. An inverted T-shaped projection 116 is formed integrally with and extends from outer layer 108 of retainer strap 66. Projection 116 has a configuration that matches upwardly facing T-slot 102 in retainer base section 64. The length of projection 116 matches the width of T-slot 102, and includes an outer extension 118 that is engaged within an undercut 120 in rim 104. Projection 116 further includes an inner extension 122 that underlies lip 84 defined by support member 60.

With the construction of hold-down 40 as described above, retainer strap 66 and support member 60 are engaged with shell 62 such that retainer strap 66 and the equipment engagement surfaces of support member 60, i.e. trough 76 and protrusions 78, are laterally spaced from and immediately adjacent each other. Retainer strap 66 is laterally offset from support arm 34, and the engagement surfaces of support member 60 are located above support arm 34 and extend laterally from support arm 34 in a direction opposite retainer strap 66.

In assembly, retainer strap 66 is first secured to shell 62 by positioning projection 116 above interior 96 defined by shell 62, and in alignment with T-slot 102. Retainer strap 66 is then moved outwardly so as to engage projection 116 within slot 102, until retainer strap 66 has attained the position as shown in FIG. 8 in which outer extension 118 of projection 116 is engaged in undercut 120 of rim 104. Support member 60 is then engaged with shell 62 by positioning support member 60 within interior 96 of shell 62. Support member 60 is positioned such that outer extension 80 engages upper edge 94 of shell 64, and such that inner lip 84 of support member 60 is engaged over inner extension 122 defined by projection 116. The resilient material of support member 60 enables lips 88 to be deformed and compressed as necessary to enable lips 88 to be positioned within openings 98 defined by shell 62. The resiliency of the material of support member 60 then returns lips 88 to their undeformed condition so that lips 88 are received within and extend through openings 98, as shown in FIG. 7. Hold-down 40 is then assembled onto support arm 34 by application of a push-on force along the longitudinal axis of support arm 34. Support member passage 70 is dimensioned to engage support arm 34, such that the resilient material of support member 60 provides frictional engagement of hold-down 40 with support arm 34. Such frictional engagement of support member 60 with support arm 34 maintains the axial position of hold-down 40 on support arm 34, yet allows hold-down 40 to be moved along the length of support arm 34 to adjust the position of hold 40 as desired.

Each hold-down 40 is then engaged with one of support arms 34 by positioning the hold-down 40 so that the passage 70 in support member 60 is in alignment with an end of one of support arms 34, and hold-down 40 is then pushed onto the support arm 34. The resilient nature of the material of support member 60 provides frictional engagement of hold-down 40 with support arm 34, to maintain hold-down 40 in position on support arm 34. The axial position of each hold-down 40 on support arm 34 can be adjusted by applying an axial force to the hold-down 40, to slide the hold-down 40 to a desired position. The material of support member 60 is selected to provide frictional engagement with support arm 34 when each hold-down 40 is in the desired position, while enabling the position of the hold-down 40 to be adjusted along support arm 40 by application of an axial force that overcomes the frictional engagement between support member 60 and support arm 40.

In operation, hold-down 40 functions as follows to maintain an item of equipment in position on support arm 34. The item of equipment, such as bicycle B, is engaged with bicycle rack 20 by positioning a component of bicycle B, such as top tube T, such that top tube T extends between and engages a hold-down 40 mounted to each of support arms 34. FIGS. 7 and 8 illustrate a typical orientation of hold-down 40 when top tube T is positioned in this manner, in which hold-down 40 is positioned on support arm 34 such that retainer strap 66 and trough 76 of support member 60 face upwardly and retainer strap 66 is in an open configuration. When top tube T is engaged with support member 60 in this manner, protrusions 78 engage top tube T so as to maintain top tube T off the bottom surface of trough 76, and the adjacent outer areas of top tube T engage the inwardly facing surfaces of trough 76 defined by support member side sections 72. The resilient material of support member 60 deforms slightly so as to accommodate the shape of top tube T, which enables support member 60 to receive and engage differently configured tubes, as well as tubes of different diameters. In addition, the weight of the bicycle on support member 60 of hold-down 40 compresses the resilient material of support member 60 at base area 74 between top tube T and support arm 34. The force applied by bicycle B to the soft, resilient material of support member 60 functions to increase the frictional engagement of support member 60 with support arm 34 at passage 70, and prevents sliding movement of hold-down 40 along support arm 34. In this manner, the weight of bicycle B on support member 60 is operable to maintain each hold-down 40 in position on support arm 34.

When top tube T is engaged with hold-down 40 in this manner, top tube T rests on the inner resilient layer 110 of retainer strap 66, and the user then wraps retainer strap 66 about top tube T and engages retainer strap teeth 114 with clasp 112. The resilient material of retainer strap inner layer 110 engages the outer surfaces of top tube T, and provides secure engagement of top tube T without scratching top tube T. In addition, the resilient material of support member 60 combines with the resilient material of retainer strap inner layer 110 to frictionally engage top tube T in a manner that prevents axial movement of top tube T relative to hold-down 40. It should be understood, however, that the resilient material of strap inner layer 110 is optional, and that retainer strap 66 may be formed of any satisfactory material with or without a resilient inner layer.

Figure 10:
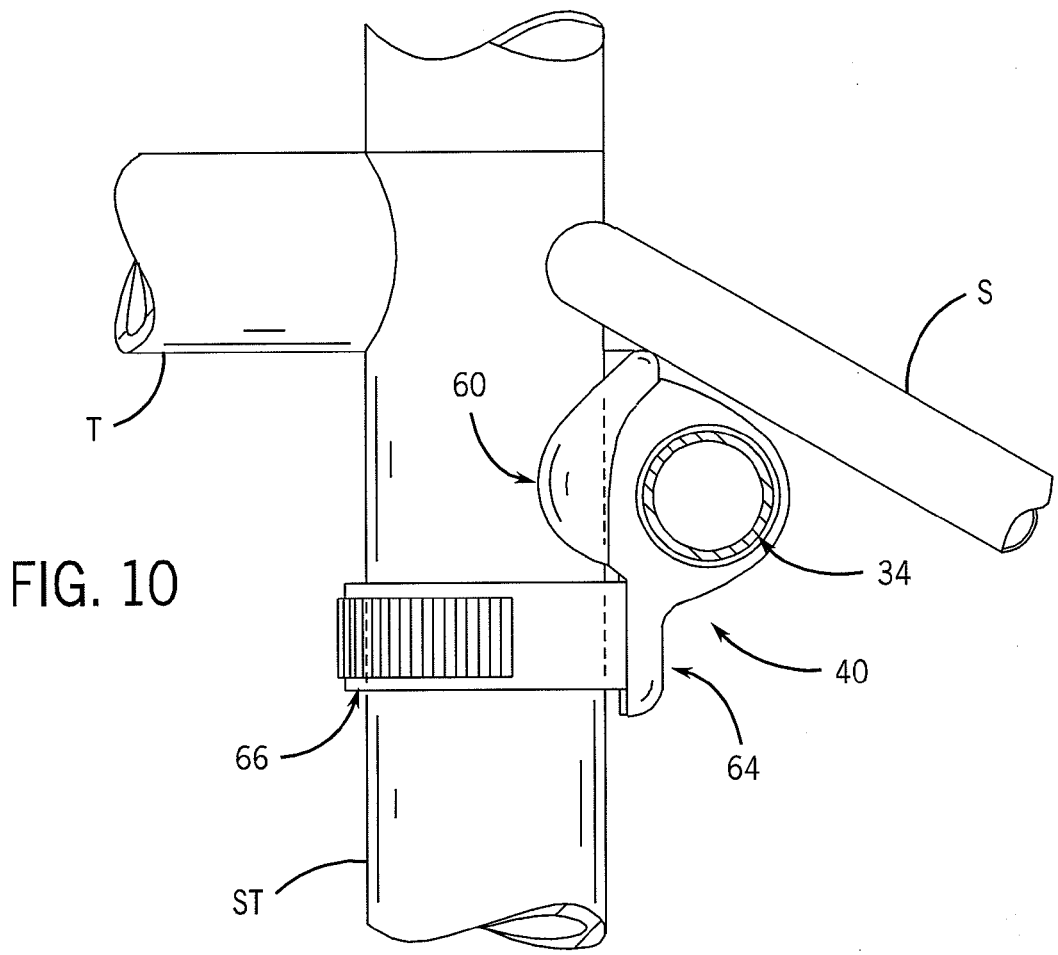
FIG. 10 is a partial section view similar to FIG. 8, showing an alternative orientation of the cradle or hold-down of the present invention for engagement with an item of equipment.

With certain configurations of the frame of bicycle B, it may not be possible to engage the bicycle top tube with hold-down 40 in a conventional manner as illustrated in FIG. 8. For example, the bicycle frame may have a top tube such as T' (FIG. 10) that does not present a length that is sufficient to rest on the width of hold-down 40 as shown and described, or the top tube of the bicycle may be oriented at an angle that prohibits conventional engagement with hold-down 40. In a situation such as this, hold-down 40 can be rotated on support arm 34 to the position as shown in FIG. 10, in which trough 76 faces laterally and extension 80 of support member 60 faces upwardly. A downwardly extending component of the frame of the bicycle, such as a seat tube ST, is positioned laterally in engagement with trough 76 of support member 60. Any satisfactory component of the bicycle frame, such as a seat stay S, is positioned so as to rest on extension 80, and retainer strap 66 is placed about seat tube ST so as to maintain the frame of the bicycle in engagement with hold-down 40. The construction of support member 60, in which extension 80 extends beyond edge 94 of shell 62, ensures that the surface of seat stay S does not contact the rigid material of shell 62, and instead rests on the soft, resilient material of support member extension 80 when hold-down 40 is in this orientation and seat stay S is in engagement with hold-down 40.

While hold-down 40 has been shown and described with respect to a specific embodiment, it is contemplated that various alternatives and modifications are possible and are within the scope of the present invention. For example, and without limitation, the laterally offset retainer strap feature of the present invention may be employed in a hold-down having a construction other than that as shown and described, wherein a resilient support member is contained within a rigid shell or cup member. Likewise, the shell and resilient support member construction of the hold-down of the present invention may be employed in an arrangement other than one in which the retainer strap is offset from the support area of the hold-down as shown and described. For example, the shell and resilient support member construction may be employed in a hold-down configuration in which the retainer strap is in alignment with the area of the hold-down that is engaged with the bicycle. Further, while the hold-down arrangement of the present invention has been shown and described in connection with an equipment carrier in the form of a bicycle rack, it is understood that the hold-down construction of the present invention may be used in a vehicle-mounted carrier for any type of equipment, and is not limited to use in connection with a bicycle rack. In addition, in a bicycle rack application, it is understood that the hold-down construction of the present invention may be used in any type of hitch-mounted or trunk-mounted rack having support members or arms that support a bicycle in a suspension-type manner. Further, while the invention has been shown and described with respect to a retainer strap having a ratchet-type engagement system, it is understood that the invention may be employed with any type of flexible retainer member that can be wrapped about an item of equipment supported on the hold-down, using any satisfactory type of engagement mechanism. It should also be understood that the specific interlocking structure of the shell and support member of the present invention may vary from that which is shown and described, and may be replaced with any other satisfactory interlocking arrangement that functions to securely maintain the support member and the shell in engagement with each other while allowing the support arm to be received within a passage of the support member and securely maintaining the support member in position relative to the shell.

Various alternatives and embodiments are contemplated as being within the scope of the following claims particularly pointing out and distinctly claiming the subject matter regarded as the invention.

I claim:

1. A hold-down for a vehicle-mounted equipment carrier having a support arm, comprising:

a rigid shell member defining an interior and an outwardly extending base section;

a resilient support member configured for engagement with the rigid shell member, wherein the resilient support member includes an equipment support area located exteriorly of the rigid shell member and configured to receive an item of equipment to be carried by the equipment carrier, and wherein the resilient support member includes a passage within which the support arm of the equipment carrier is received, wherein the base section of the rigid shell member is laterally offset from the equipment support area of the resilient support member; and a flexible retainer member secured to the base section of the rigid shell member, wherein the flexible retainer member is adapted to be wrapped about the item of equipment to maintain the item of equipment on the equipment support area of the resilient support member;

wherein the rigid shell member and the resilient support member include interlocking structure that maintains the resilient support member in engagement with the rigid shell member, wherein the passage in the resilient support member opens onto opposed side surfaces defined by the resilient support member, and wherein the interlocking structure comprises a pair of peripheral lips, wherein each peripheral lip extends outwardly from one of the side surfaces of the support member where the passage opens onto the side surface of the support member, and wherein the rigid shell member includes a pair of openings within which the peripheral lips are received, wherein engagement of the peripheral lips within the openings functions to interlock the resilient support member and the rigid shell member.

2. A hold-down for a vehicle-mounted equipment carrier having a support arm, comprising:

a rigid shell member defining an interior and an outwardly extending base section;

a resilient support member configured for engagement with the rigid shell member, wherein the resilient support member includes an equipment support area located exteriorly of the rigid shell member and configured to receive an item of equipment to be carried by the equipment carrier, and wherein the resilient support member includes a passage within which the support arm of the equipment carrier is received, wherein the base section of the rigid shell member is laterally offset from the equipment support area of the resilient support member; and a flexible retainer member secured to the base section of the rigid shell member, wherein the flexible retainer member is adapted to be wrapped about the item of equipment to maintain the item of equipment on the equipment support area of the resilient support member;

wherein the rigid shell member and the resilient support member include interlocking structure that maintains the resilient support member in engagement with the rigid shell member;

wherein the flexible retainer member is secured to the base section of the rigid shell member via interlocking engagement structure provided on the flexible retainer member and the base section, wherein the interlocking engagement structure comprises a slidable connection between the retainer member and the base section by which the retainer member is engaged with the base section, and wherein the resilient support member includes an internal surface that engages the retainer member to maintain the retainer member in engagement with the base section.

3. A hold-down for a vehicle-mounted equipment carrier having a support arm, comprising:

a rigid shell member defining an interior;

a resilient support member configured for engagement with the rigid shell member, wherein the resilient support member includes an equipment support area located exteriorly of the rigid shell member and configured to receive an item of equipment to be carried by the equipment carrier, and wherein the resilient support member includes a passage within which the support arm of the equipment carrier is received; and a flexible retainer member adapted to be wrapped about the item of equipment to maintain the item of equipment on the equipment support area of the resilient support member;

wherein the rigid shell member and the resilient support member include interlocking structure that maintains the resilient support member in engagement with the rigid shell member, wherein the passage in the resilient support member opens onto opposed side surfaces defined by the resilient support member, and wherein the interlocking structure comprises a pair of peripheral lips, each of which extends outwardly from one of the side surfaces of the support member where the passage opens onto the side surface of the support member, and wherein the rigid shell member includes a pair of openings within which the peripheral lips are received, wherein engagement of the peripheral lips within the openings functions to interlock the resilient support member and the rigid shell member.

4. A hold-down for a vehicle-mounted equipment carrier having a support arm, comprising:

a rigid shell member defining an interior and an outwardly extending base section;

a resilient support member configured for engagement with the rigid shell member, wherein the resilient support member includes an equipment support area located exteriorly of the rigid shell member and configured to receive an item of equipment to be carried by the equipment carrier, and wherein the resilient support member includes a passage within which the support arm of the equipment carrier is received, wherein the base section of the rigid shell member is laterally offset from the equipment support area of the resilient support member; and a flexible retainer member secured to the base section of the rigid shell member, wherein the flexible retainer member is adapted to be wrapped about the item of equipment to maintain the item of equipment on the equipment support area of the resilient support member;

wherein the rigid shell member and the resilient support member include interlocking structure that maintains the resilient support member in engagement with the rigid shell member; and wherein the rigid shell member includes an outwardly facing opening defined by an outwardly facing edge, wherein the equipment support area of the resilient support member includes an edge that faces and engages the outwardly facing edge of the rigid shell member.

5. The hold-down of claim 4, wherein the resilient support member includes an extension that extends laterally beyond the outwardly facing edge in a direction opposite the base section of the rigid shell member.

6. A hold-down for a vehicle-mounted equipment carrier having a support arm, comprising:

a rigid shell member defining an interior;

a resilient support member configured for engagement with the rigid shell member, wherein the resilient support member includes an equipment support area located exteriorly of the rigid shell member and configured to receive an item of equipment to be carried by the equipment carrier, and wherein the resilient support member includes a passage within which the support arm of the equipment carrier is received; and a flexible retainer member adapted to be wrapped about the item of equipment to maintain the item of equipment on the equipment support area of the resilient support member;

wherein the rigid shell member and the resilient support member include interlocking structure that maintains the resilient support member in engagement with the rigid shell member;

wherein the rigid shell member includes a base section that is laterally offset from the interior defined by the rigid shell member, and wherein the flexible retainer member is engaged with the base section of the rigid shell member such that the flexible retainer member is laterally offset from the equipment support area of the resilient support member, wherein the flexible retainer member is secured to the base section of the rigid shell member via a slidable engagement arrangement in which the flexible retainer member is engaged with the base section upon outward sliding movement of the retainer member relative to the base section, and wherein the resilient support member is configured for engagement within the interior of the rigid shell member and includes a surface that faces and engages the retainer member to maintain the retainer member in engagement with the base section of the rigid shell member.

7. The hold-down of claim 6, wherein the retainer member and the base section of the rigid shell member include mating slidable engagement structure that prevents disengagement of the retainer member from the base section upon outward sliding movement of the retainer member relative to the base section.

8. A hold-down for a vehicle-mounted equipment carrier having a support arm, comprising:

an engagement member including an equipment support area configured to receive an item of equipment to be carried by the equipment carrier, wherein the engagement member includes a passage within which the support arm of the equipment carrier is received, and wherein the engagement member defines a retainer base section that is laterally offset from the equipment support area; and a flexible retainer member secured to the retainer base section of the engagement member, wherein the flexible retainer member is adapted to be wrapped about the item of equipment to maintain the item of equipment on the equipment support area of the engagement member;

wherein the engagement member comprises a rigid shell member defining an interior, and a resilient support member configured for engagement with the rigid shell member, wherein the resilient support member includes an equipment support area located exteriorly of the rigid shell member and configured to receive an item of equipment to be carried by the equipment carrier, and wherein the resilient support member includes a passage within which the support arm of the equipment carrier is received;

wherein the retainer base section is formed integrally with the rigid shell member and is laterally offset from the equipment support area of the resilient support member; and wherein the rigid shell member includes an outwardly facing opening defined by an outwardly facing edge, wherein the equipment support area of the resilient support member includes an edge that faces and engages the outwardly facing edge of the rigid shell member.

9. The hold-down of claim 8, wherein the resilient support member includes an extension that extends laterally beyond the outwardly facing edge in a direction opposite the base section of the rigid shell member.

10. A hold-down for a vehicle-mounted equipment carrier having a support arm, comprising:
a rigid shell member including a side wall defining an annular upper edge, wherein the side wall encloses an interior area of the rigid shell member;
a resilient support member configured for engagement with the rigid shell member, wherein the resilient support member includes an inner portion that extends into the interior area of the rigid shell member such that the upper edge of the rigid shell member circumferentially surrounds the inner portion and the inner portion defines a lowermost area that is located below the upper edge of the rigid shell member, and wherein the resilient support member further includes an outer portion located outwardly of the upper edge of the rigid shell member and defining an equipment support area located exteriorly of the rigid shell member, wherein the outer portion of the resilient support member is configured to receive an item of equipment to be carried by the equipment carrier, and wherein the inner portion of the resilient support member includes a passage within which the support arm of the equipment carrier is received; and
a flexible retainer member interconnected with the rigid shell member and adapted to be wrapped about the item of equipment to maintain the item of equipment on the equipment support area of the resilient support member.

11. The hold-down of claim 10, wherein the rigid shell member and the resilient support member include interlocking structure that maintains the resilient support member in engagement with the rigid shell member.

12. The hold-down of claim 11, wherein the passage in the resilient support member opens onto opposed side surfaces defined by the resilient support member, and wherein the interlocking structure comprises a pair of peripheral lips, each of which extends outwardly from one of the side surfaces of the support member where the passage opens onto the side surface of the support member, and wherein the rigid shell member includes a pair of openings within which the peripheral lips are received, wherein engagement of the peripheral lips within the openings functions to interlock the resilient support member and the rigid shell member.

13. The hold-down of claim 11, wherein the rigid shell member includes a base section that is laterally offset from the interior area defined by the rigid shell member, and wherein the flexible retainer member is engaged with the base section of the rigid shell member such that the flexible retainer member is laterally offset from the equipment support area of the resilient support member.

14. The hold-down of claim 13, wherein the flexible retainer member is secured to the base section of the rigid shell member via a slidable engagement arrangement in which the flexible retainer member is engaged with the base section upon outward sliding movement of the retainer member relative to the base section, and wherein the resilient support member is configured for engagement within the interior area of the rigid shell member and includes a surface that faces and engages the retainer member to maintain the retainer member in engagement with the base section of the rigid shell member.

15. The hold-down of claim 13, wherein the retainer member and the base section of the rigid shell member include mating slidable engagement structure that prevents disengagement of the retainer member from the base section upon outward sliding movement of the retainer member relative to the base section.

16. A hold-down for a vehicle-mounted equipment carrier having a support arm, comprising:
an engagement member having an equipment support area configured to receive an item of equipment to be carried by the equipment carrier, and wherein the engagement member includes a passage within which the support arm of the equipment carrier is received, and wherein the engagement member defines a retainer base section that is laterally offset from the equipment support area, wherein the engagement member comprises a rigid shell member including a side wall defining an annular upper edge, wherein the side wall encloses an interior area of the rigid shell member, and a resilient support member configured for engagement with the rigid shell member, wherein the resilient support member defines an inner portion that extends into the interior area of the rigid shell member such that the upper edge of the rigid shell member circumferentially surrounds the inner portion and the inner portion defines a lowermost area that is located below the upper edge of the rigid shell member, and wherein the resilient support member further includes an outer portion including the equipment support area located outwardly of the upper edge of the rigid shell member, wherein the equipment support area is located exteriorly of the rigid shell member and is configured to receive the item of equipment, and wherein the inner portion of the resilient support member includes a passage within which the support arm of the equipment carrier is received; and
a flexible retainer member secured to the retainer base section of the engagement member, wherein the flexible retainer member is adapted to be wrapped about the item of equipment to maintain the item of equipment on the equipment support area of the engagement member.

17. The hold-down of claim 16, wherein the equipment support area of the resilient support member includes an edge that faces and engages the upper edge of the rigid shell member.

18. The hold-down of claim 16, wherein the rigid shell member includes a retainer base section formed integrally with the rigid shell member, wherein the retainer base section is laterally offset from the equipment support area of the resilient support member.

19. The hold-down of claim 18, wherein the rigid shell member and the resilient support member include interlocking structure that maintains the resilient support member in engagement with the rigid shell member.

20. The hold-down of claim 18, wherein the flexible retainer member is secured to the retainer base section of the rigid shell member via interlocking engagement structure provided on the flexible retainer member and the base section.

21. The hold-down of claim 18, wherein the resilient support member includes an extension that extends laterally beyond the upper edge in a direction opposite the base section of the rigid shell member.

22. A hold-down for a vehicle-mounted equipment carrier having a support arm, comprising:
a rigid shell member including a side wall defining an annular upper edge, wherein the side wall encloses an interior area of the rigid shell member, and wherein the rigid shell member includes an outwardly extending base section;
a resilient support member configured for engagement with the rigid shell member, wherein the resilient support member includes an inner portion that extends into the interior area of the rigid shell member such that the upper edge of the rigid shell member circumferentially surrounds the inner portion and the inner portion is enclosed by the side wall of the rigid shell member, wherein the inner portion of the resilient support member defines a lowermost area that is located below the upper edge of the rigid shell member, and wherein the resilient support member further includes an outer portion defining an equipment support area located above the upper edge of the side wall and exteriorly of the rigid shell member and configured to receive an item of equipment to be carried by the equipment carrier, and wherein the inner portion of the resilient support member includes a passage within which the support arm of the equipment carrier is received, wherein the base section of the rigid shell member is laterally offset from the equipment support area of the resilient support member; and
a flexible retainer member secured to the base section of the rigid shell member, wherein the flexible retainer member is adapted to be wrapped about the item of equipment to maintain the item of equipment on the equipment support area of the resilient support member.

23. The hold-down of claim 22, wherein the equipment support area of the resilient support member includes an edge that faces and engages the outer edge of the side wall of the rigid shell member.

24. The hold-down of claim 22, wherein the resilient support member includes an extension that extends laterally beyond the upper edge in a direction opposite the base section of the rigid shell member.

25. The hold-down of claim 22, wherein the rigid shell member and the resilient support member include interlocking structure that maintains the resilient support member in engagement with the rigid shell member.

26. The hold-down of claim 25, wherein the resilient support member includes a base area located between the support arm and the item of equipment that compresses when the item of equipment is engaged with the hold-down to apply a frictional force to the support arm that prevents axial movement of the hold-down relative to the support arm.

27. The hold-down of claim 25, wherein the passage in the resilient support member opens onto opposed side surfaces defined by the resilient support member, and wherein the interlocking structure comprises a pair of peripheral lips, each of which extends outwardly from one of the side surfaces of the support member where the passage opens onto the side surface of the support member, and wherein the rigid shell member includes a pair of openings within which the peripheral lips are received, wherein engagement of the peripheral lips within the openings functions to interlock the resilient support member and the rigid shell member.

28. The hold-down of claim 25, wherein the flexible retainer member is secured to the base section of the rigid shell member via interlocking engagement structure provided on the flexible retainer member and the base section.

29. The hold-down of claim 26, wherein the interlocking engagement structure comprises a slidable connection between the retainer member and the base section by which the retainer member is engaged with the base section, and wherein the resilient support member includes an internal surface that engages the retainer member to maintain the retainer member in engagement with the base section.

* * * * *

UNITED STATES PATENT AND TRADEMARK OFFICE
CERTIFICATE OF CORRECTION

| | |
|---|---|
| PATENT NO. | : 7,213,731 B1 |
| APPLICATION NO. | : 10/682717 |
| DATED | : May 8, 2007 |
| INVENTOR(S) | : Clint D. Kolda |

It is certified that error appears in the above-identified patent and that said Letters Patent is hereby corrected as shown below:

IN THE CLAIMS

CLAIM 29, column 14, line 41, delete "26" and substitute therefore -- 28 --.

Signed and Sealed this

Twenty-eighth Day of October, 2008

JON W. DUDAS
*Director of the United States Patent and Trademark Office*